United States Patent
Matsuyama et al.

(10) Patent No.: US 8,891,114 B2
(45) Date of Patent: Nov. 18, 2014

(54) IMAGE FORMING APPARATUS, DEVICE COOPERATION SYSTEM, AND DEVICE COOPERATION METHOD

(75) Inventors: Kengo Matsuyama, Kanagawa (JP); Fumitake Yamanishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 83 days.

(21) Appl. No.: 13/286,447

(22) Filed: Nov. 1, 2011

(65) Prior Publication Data

US 2012/0113465 A1 May 10, 2012

(30) Foreign Application Priority Data

Nov. 8, 2010 (JP) ................................ 2010-249483

(51) Int. Cl.
*H04N 1/00* (2006.01)
*H04N 1/32* (2006.01)
*G06F 3/12* (2006.01)

(52) U.S. Cl.
CPC ...... *G06F 3/1205* (2013.01); *H04N 2201/0094* (2013.01); *H04N 1/00474* (2013.01); *H04N 1/32523* (2013.01); *H04N 1/3255* (2013.01); *H04N 1/32534* (2013.01); *G06F 3/1261* (2013.01); *H04N 1/00482* (2013.01); *H04N 2201/0039* (2013.01); *H04N 1/00347* (2013.01); *H04N 1/00424* (2013.01); *H04N 1/00917* (2013.01); *H04N 1/00411* (2013.01); *H04N 2201/0036* (2013.01); *G06F 3/1291* (2013.01)

USPC .......................................................... 358/1.15

(58) Field of Classification Search
CPC .... G06F 3/1205; G06F 3/1261; G06F 3/1291
USPC ....................... 358/150, 296; 705/8
See application file for complete search history.

(56) References Cited

U.S. PATENT DOCUMENTS

| | | | |
|---|---|---|---|
| 5,287,194 A * | 2/1994 | Lobiondo | ..................... 358/296 |
| 2010/0118334 A1* | 5/2010 | Iwase | ........................... 358/1.15 |
| 2010/0118340 A1* | 5/2010 | Yamada | ....................... 358/1.15 |

FOREIGN PATENT DOCUMENTS

| | | |
|---|---|---|
| JP | 2009-018499 | 1/2009 |
| JP | 2009-076004 | 4/2009 |

* cited by examiner

*Primary Examiner* — Tammy Pham
*Assistant Examiner* — Bharatkumar Shah
(74) *Attorney, Agent, or Firm* — IPUSA, PLLC

(57) ABSTRACT

An image forming apparatus includes an input unit that inputs print conditions; a search unit that searches for image forming apparatuses that can execute the print conditions; a display unit that displays icons of the found image forming apparatuses; a generating unit that generates a print job when an icon corresponding to one of the image forming apparatuses is operated; a sending unit that sends the print job to the one of the image forming apparatuses; and a management unit configured to manage progress situation information of print jobs. When an icon of a second image forming apparatus is operated after a print job is sent to a first image forming apparatus and before the first image forming apparatus completes the print job, print jobs are regenerated to distribute a remaining number of sheets between the first image forming apparatus and the second image forming apparatus.

7 Claims, 18 Drawing Sheets

FIG.5

COOPERATIVE PRINTING | PRINT SETTING

HOLE-PUNCHING : ●EXECUTE ○DO NOT EXECUTE

STAPLING : ●EXECUTE ○DO NOT EXECUTE

SHEET SIZE : ●A4 ○A3 ○AUTOMATIC SIZE DETECTION

NUMBER OF SHEETS : ●SPECIFIED OVERALL ○SPECIFIED INDIVIDUALLY

TOTAL NUMBER OF SHEETS : 20

OK ~401  CANCEL

STAPLING : –
SHEET SIZE : –
NUMBER OF SHEETS : –

IMAGE FORMING APPARATUS, DEVICE COOPERATION SYSTEM, AND DEVICE COOPERATION METHOD

BACKGROUND OF THE INVENTION

1. Field of the Invention

The present invention relates to an image forming apparatus, a device cooperation system, and a device cooperation method.

2. Description of the Related Art

There are image forming apparatuses in which plural functions such as copying, scanning, printing, and fax transmission are accommodated in a single unit. With advanced CPU performances, larger memory capacities, faster communication technologies, and enhanced digital image technologies, the present image forming apparatus (MFP: multi-function peripheral) can function as more than a digital copier. For example, the MFP can transmit and receive data such as images and documents through a network and fax transmission, so that various usage formats and functions are provided in the user environment.

One of the usage formats of an MFP involves plural MFPs connected to a network that can cooperate with each other, so that processes can be distributed or entrusted among each other (device cooperation). For example, when performing high volume printing, a printing job of one MFP is distributed among the other MFPs connected to the network, so that the printing process can be completed within a short period of time. Furthermore, assuming that an MFP is not equipped with a particular function (for example, hole-punching or stapling), the MFP can search via the network for another MFP having that particular function, and entrust the found MFP to perform a process using the particular function.

However, in the conventional technology of device cooperation, although it is possible to cause all of the devices cooperating with each other to start or stop printing, it is not possible to individually control the print operation of each of the devices. For example, it is not possible to cause only one device to stop printing during a cooperative print operation and to perform another process, or to cause another device to join during the cooperative print operation.

Patent document 1 discloses a technology relevant to a printing system for facilitating operations of a user to make changes in a cooperative print operation. Specifically, icons corresponding to the image forming apparatuses performing cooperative printing are displayed on a screen image of the operation unit, and the icons are dragged and dropped to stop jobs of the image forming apparatuses corresponding to the icons.

Patent Document 1: Japanese Laid-Open Patent Publication No. 2009-76004

According to patent document 1, icons corresponding to image forming apparatuses are displayed on a panel, and the icons are dragged and dropped, so that jobs of each of the image forming apparatuses corresponding to the icons are separately stopped. However, patent document 1 does not describe anything about separately controlling the operations of starting printing for each of the image forming apparatuses. Thus, there is still room for improvement in terms of controlling each of the devices in device cooperation.

SUMMARY OF THE INVENTION

The present invention provides an image forming apparatus, a device cooperation system, and a device cooperation method in which one or more of the above-described disadvantages are eliminated.

A preferred embodiment of the present invention provides an image forming apparatus, a device cooperation system, and a device cooperation method, which are capable of flexibly controlling instructions given to each of the cooperative devices for executing jobs, in a device cooperation system including plural devices that execute jobs in cooperation with each other.

According to an aspect of the present invention, there is provided an image forming apparatus in a device cooperation system in which plural image forming apparatuses are connected to each other via a network and the plural image forming apparatuses execute print jobs in a cooperative manner, the image forming apparatus including a print condition input unit configured to input print conditions including a number of print sheets; a search unit configured to search, in the network, for image forming apparatuses that are capable of executing the print conditions; a display unit configured to display, on a display device, icons of the image forming apparatuses found by the search unit; a print job generating unit configured to generate a print job to be executed by each image forming apparatus in accordance with the print conditions, when an icon of an image forming apparatus displayed by the display unit is operated; a print job sending unit configured to send the print job generated by the print job generating unit to the image forming apparatus whose icon has been operated; and a progress situation management unit configured to manage progress situation information of print jobs, wherein when an icon of a second image forming apparatus displayed by the display unit is operated after the print job sending unit sends a print job to a first image forming apparatus and before the first image forming apparatus completes the print job, the print job generating unit regenerates print jobs for distributing, between the first image forming apparatus and the second image forming apparatus, a remaining number of sheets remaining in the print job being executed by the first image forming apparatus at a time point when the icon of the second image forming apparatus is operated, the remaining number of sheets being determined based on the progress situation information of the print job being executed by the first image forming apparatus, and the print job sending unit sends the regenerated print jobs to the first image forming apparatus and the second image forming apparatus.

According to an aspect of the present invention, there is provided a device cooperation system in which plural image forming apparatuses are connected to each other via a network and the plural image forming apparatuses execute print jobs in a cooperative manner, wherein each of the plural image forming apparatuses includes a print condition input unit configured to input print conditions including a number of print sheets; a search unit configured to search, in the network, for image forming apparatuses that are capable of executing the print conditions; a display unit configured to display, on a display device, icons of the image forming apparatuses found by the search unit; a print job generating unit configured to generate a print job to be executed by each image forming apparatus in accordance with the print conditions, when an icon of an image forming apparatus displayed by the display unit is operated; a print job sending unit configured to send the print job generated by the print job generating unit to the image forming apparatus whose icon has been operated; and a progress situation management unit configured to manage progress situation information of print jobs, wherein when an icon of a second image forming apparatus displayed by the display unit is operated after the print job sending unit sends a print job to a first image forming apparatus and before the first image forming apparatus completes the print job, the print job generating unit regenerates print jobs for distributing, between the first image forming apparatus and the second image forming apparatus, a remaining number of sheets remaining in the print job being executed by the first image forming apparatus at a time point when the icon of the second image forming apparatus is operated, the remaining number of sheets being determined based on the progress situation information of the print job being executed by the first image forming apparatus, and the print job sending unit sends the regenerated print jobs to the first image forming apparatus and the second image forming apparatus.

According to an aspect of the present invention, there is provided a device cooperation method performed by an image forming apparatus in a device cooperation system in which plural image forming apparatuses are connected to each other via a network and the plural image forming apparatuses execute print jobs in a cooperative manner, the device cooperation method including inputting print conditions including a number of print sheets; searching, in the network, for image forming apparatuses that are capable of executing the print conditions; displaying, on a display device, icons of the image forming apparatuses found during the searching; generating a print job to be executed by each image forming apparatus in accordance with the print conditions, when an icon of an image forming apparatuses displayed on the display device is operated; sending the print job generated at the generating to the image forming apparatus whose icon has been operated; and managing progress situation information of print jobs, wherein the generating includes regenerating print jobs when an icon of a second image forming apparatus displayed on the display device is operated after a print job is sent to a first image forming apparatus and before the first image forming apparatus completes the print job, the print jobs being regenerated for distributing, between the first image forming apparatus and the second image forming apparatus, a remaining number of sheets remaining in the print job being executed by the first image forming apparatus at a time point when the icon of the second image forming apparatus is operated, the remaining number of sheets being determined based on the progress situation information of the print job being executed by the first image forming apparatus, and the sending includes sending the regenerated print jobs to the first image forming apparatus and the second image forming apparatus.

BRIEF DESCRIPTION OF THE DRAWINGS

Other objects, features and advantages of the present invention will become more apparent from the following detailed description when read in conjunction with the accompanying drawings, in which:

FIG. 5 illustrates an operation screen image (part 2)

DETAILED DESCRIPTION OF THE PREFERRED EMBODIMENTS

A description is given, with reference to the accompanying drawings, of embodiments of the present invention.

System Configuration

Overall Configuration

Figure 1:
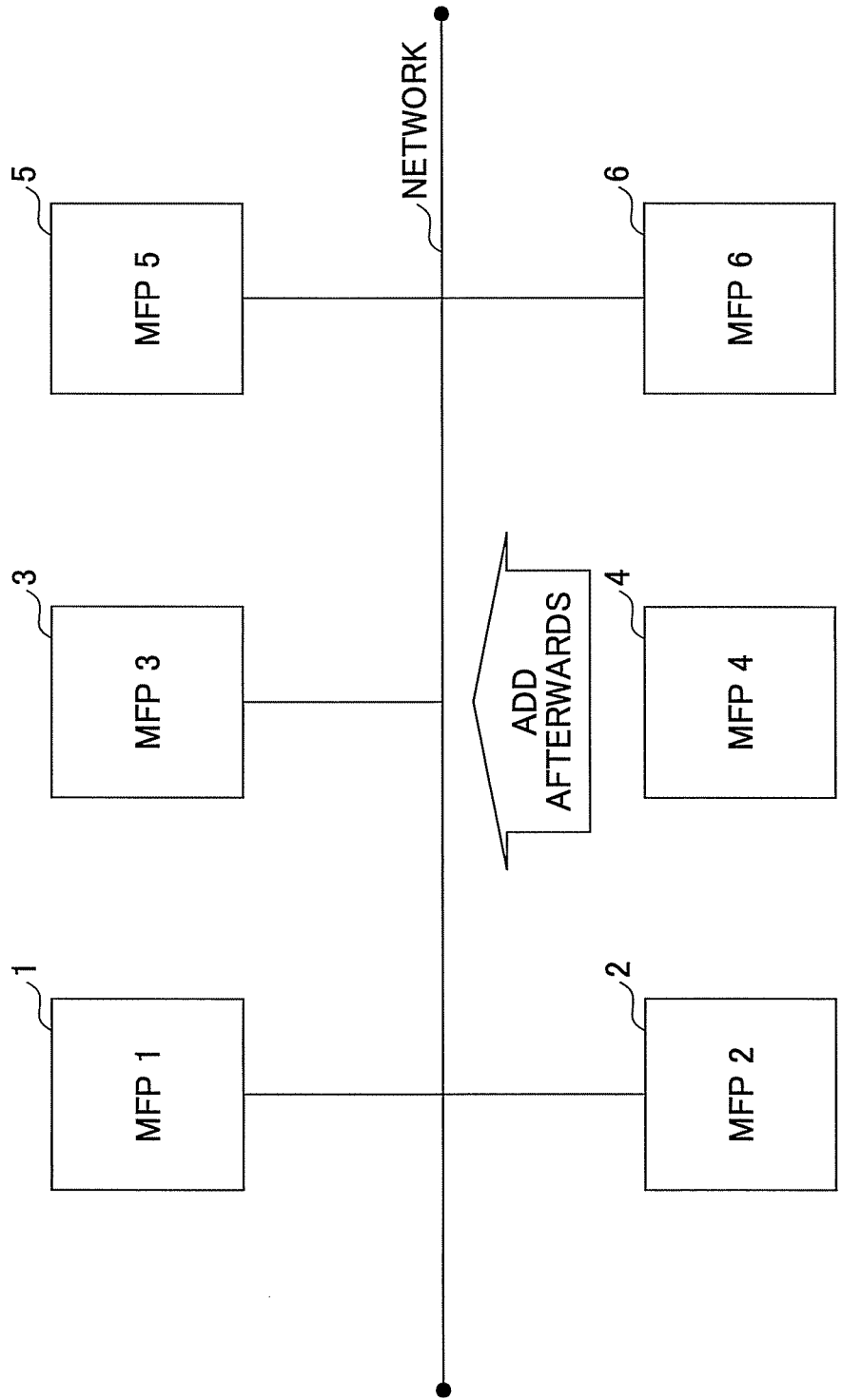
FIG. 1 illustrates a system configuration according to an embodiment of the present invention.

First, a description is given of the overall configuration of an embodiment of the present invention. FIG. 1 illustrates a system configuration according to the present embodiment. As shown in FIG. 1, an MFP 1, an MFP 2, an MFP 3, an MFP 4, an MFP 5, and an MFP 6 (also collectively referred to as an MFP) are connected to each other via a network.

The plural MFPs (multi-function peripherals) shown in FIG. 1 are image forming apparatuses in which plural functions such as copying, scanning, printing, and fax transmission are accommodated in a single unit.

Furthermore, in FIG. 1, the MFPs of the present embodiment are connected to each other via the network, which is assumed to be a LAN (Local Area Network) in the same segment. This system configuration is merely one embodiment; there may be more MFPs included in the system, and the MFPs may be configured and arranged in any other way as long as they are connected to each other via the network. Furthermore, the network may be a WAN (Wide Area Network).

Hardware

Figure 2:
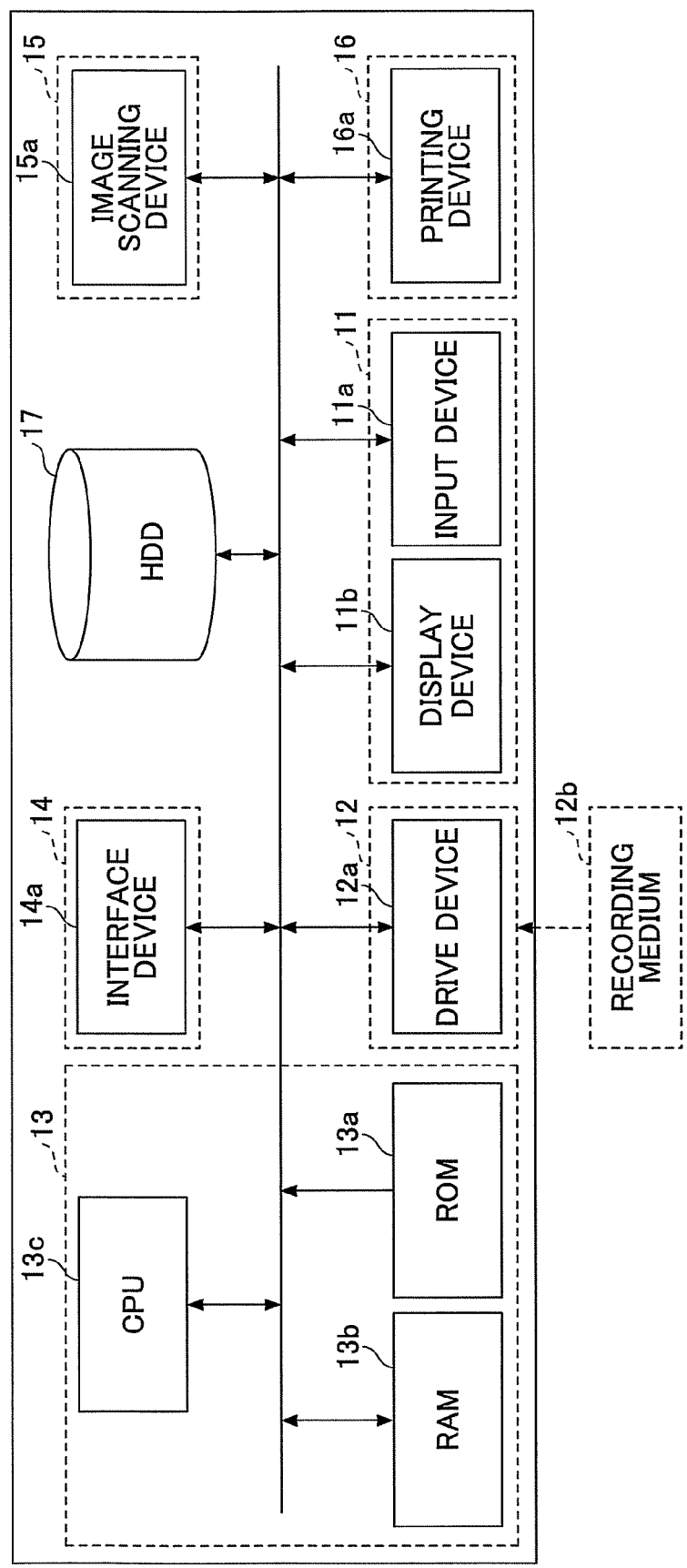
FIG. 2 illustrates a hardware configuration of an MFP according to an embodiment of the present invention.

A brief description is given of a hardware configuration of the MFP according to the present embodiment. FIG. 2 illustrates a hardware configuration of the MFP according to the present embodiment.

The MFP according to the present embodiment includes an operation panel 11, a storage medium I/F 12, a controller 13, a data communication I/F 14, a scanner 15, a plotter 16, and a HDD (Hard Disk Drive) 17, which are connected to each other. The operation panel 11 includes an input device 11a and a display device 11b. The input device 11a includes hard keys, and is used for inputting various operation signals into the main unit of the MFP. The display device 11b includes a display, and is used for displaying various information items relevant to image forming operations. The data communication I/F 14 includes an interface device 14a, which is an interface for connecting the MFP to data transmission paths such as a network and a fax transmission line. The HDD 17 stores various data items such as received document data and scanned image data handled by the MFP as well as data used by various applications. Furthermore, the HDD 17 manages these data items by a predetermined file system or DB (database).

The data items stored in the HDD 17 include data input from a recording medium 12b. The recording medium 12b is set in a drive device 12a included in the storage medium I/F 12, and various data items are stored into the HDD 17 from the recording medium 12b via the drive device 12a.

The controller 13 includes a ROM (Read Only Memory) 13a, a RAM (Random Access Memory) 13b, and a CPU (Central Processing Unit) 13c. The ROM 13a stores programs executed when the MFP is activated, as well as various data items. The RAM 13b temporarily holds various programs and data items read from the ROM 13a and the HDD 17. Furthermore, the CPU 13c executes programs that are temporarily held by the RAM 13b. The controller 13 performs the following operations. For example, when print data is received via the data communication I/F 14, the controller 13 causes the CPU 13c to execute a program (PDL parser) that can interpret PDL (Page Description Language) that has been loaded into the RAM 13b from the ROM 13a, interprets the print data, and generates a bitmap image.

The scanner 15 includes an image scanning device 15a, and optically scans an original document placed on a scanning surface and generates image data. The plotter 16 includes a printing device 16a, and prints a bitmap image onto a recording sheet by an electrophotographic processing method.

As described above, the MFP according to the present embodiment implements at least the basic functions relevant to image formation, such as copying scanning, printing, and fax transmission.

Functions

Figure 3:
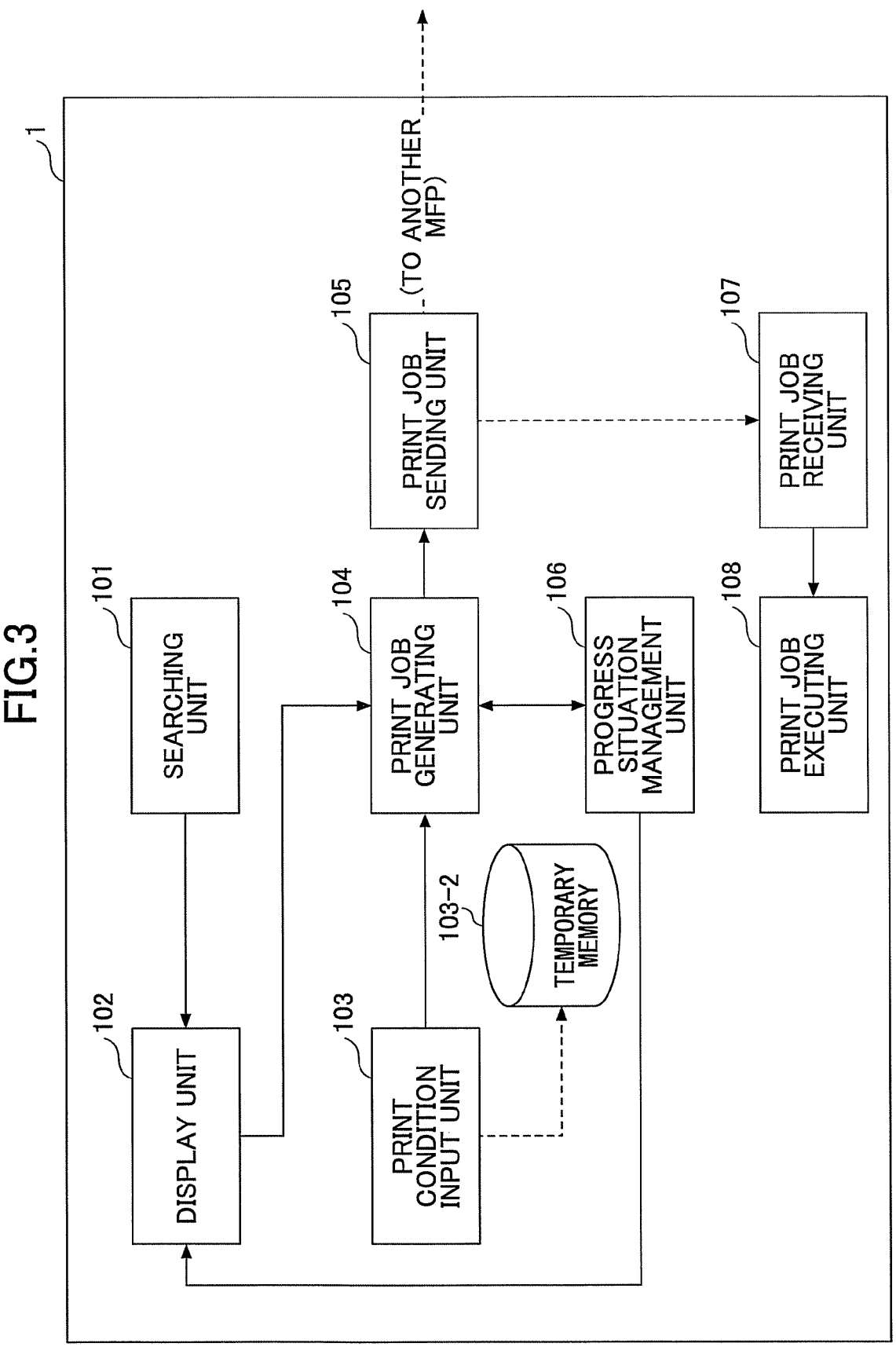
FIG. 3 is a functional block diagram indicating the main functions of the MFP according to an embodiment of the present invention.

Next, a description is given of the main functional configurations of the MFP according to the present embodiment. FIG. 3 is a functional block diagram indicating the main functions of the MFP according to the present embodiment. The main functions of an MFP 1 include a searching unit 101, a display unit 102, a print condition input unit 103, a print job generating unit 104, a print job sending unit 105, a progress situation management unit 106, a print job receiving unit 107, and a print job executing unit 108 (the MFPs 2 through 6 also have the same functions as the MFP 1).

The searching unit 101 has a function of searching for MFPs in the network. When performing the search, the searching unit 101 searches for MFPs in the network, and also searches for functions included in the MFP that has been found.

The display unit 102 displays the MFP found by the searching unit 101. In the present embodiment, an MFP icon is displayed for each MFP that has been found. It is also possible to display only the MFPs that can execute the print conditions input by the user, among the MFPs that have been found. The display unit 102 is, for example, implemented by the operation panel 11.

The print condition input unit 103 inputs various print conditions including the number of print sheets. Print conditions mean print setting parameters, such as the number of print sheets, the sheet size, the magnification ratio, whether to perform stapling, and whether to perform hole-punching. The print condition input unit 103 is implemented by, for example, the operation panel 11. The input print conditions are saved in a temporary memory 103-2.

The print job generating unit 104 generates a print job according to print conditions input by the user, when the user operates an MFP icon displayed on the display unit 102 (print execution operation). When one MFP icon is operated, a print job is generated for the corresponding one MFP. When plural (or all) MFP icons are operated, a print job (distributed print job) is generated for the corresponding plural (or all) MFPs. That is to say, a print job is generated in accordance to an MFP (or MFPs) specified by the user.

Furthermore, the print job generating unit 104 performs the following operations. Specifically, when a user additionally operates another MFP icon to be a target of device cooperation while a certain print job is being executed, the job generating unit 104 recognizes, based on the progress situation, the remaining number of print sheets at the time point of operating the additional MFP icon. Then, the job generating unit 104 regenerates a print job so that the remaining print sheets are distributed across all of the MFPs that are targets of device cooperation.

The print job sending unit 105 sends the generated print job to the MFP corresponding to the MFP icon operated by the user.

The progress situation management unit 106 manages progress situation information of the print job. For example, the progress situation management unit 106 receives, from the MFP to which the print job has been sent, a report every time printing of one sheet is completed. Accordingly, the progress situation management unit 106 manages and recognizes the progress situation of the print job in a point by point manner.

The print job receiving unit 107 receives a print job when a print job is sent to the MFP 1. When a print job is sent from the print job sending unit 105 included in the same MFP (hereinafter, self-MFP), such a print job is to be executed in the self-MFP, and therefore the print job is executed at the print job executing unit 108 of the self-MFP. Meanwhile, when a print job is sent to the print job sending unit 105 from another MFP, it means that such a print job is assigned to the self-MFP according to device cooperation.

The print job executing unit 108 analyzes and executes a print job received from the print job receiving unit 107. For example, the print job executing unit 108 is implemented by the controller 13 and the plotter 16.

Operation Example

In the present embodiment, it is assumed that the user operates the operation panel 11 of the MFP 1, so that a print operation for printing plural sheets is performed according to device cooperation. That is to say, the print job is distributed across plural MFPs such as MFP 1, MFP 2, and MFP 3, so that the print job is performed by the plural MFPs. A description is given of an example of an operation performed by the user with the operation panel 11, with reference to specific operation screen image examples.

Figure 4:
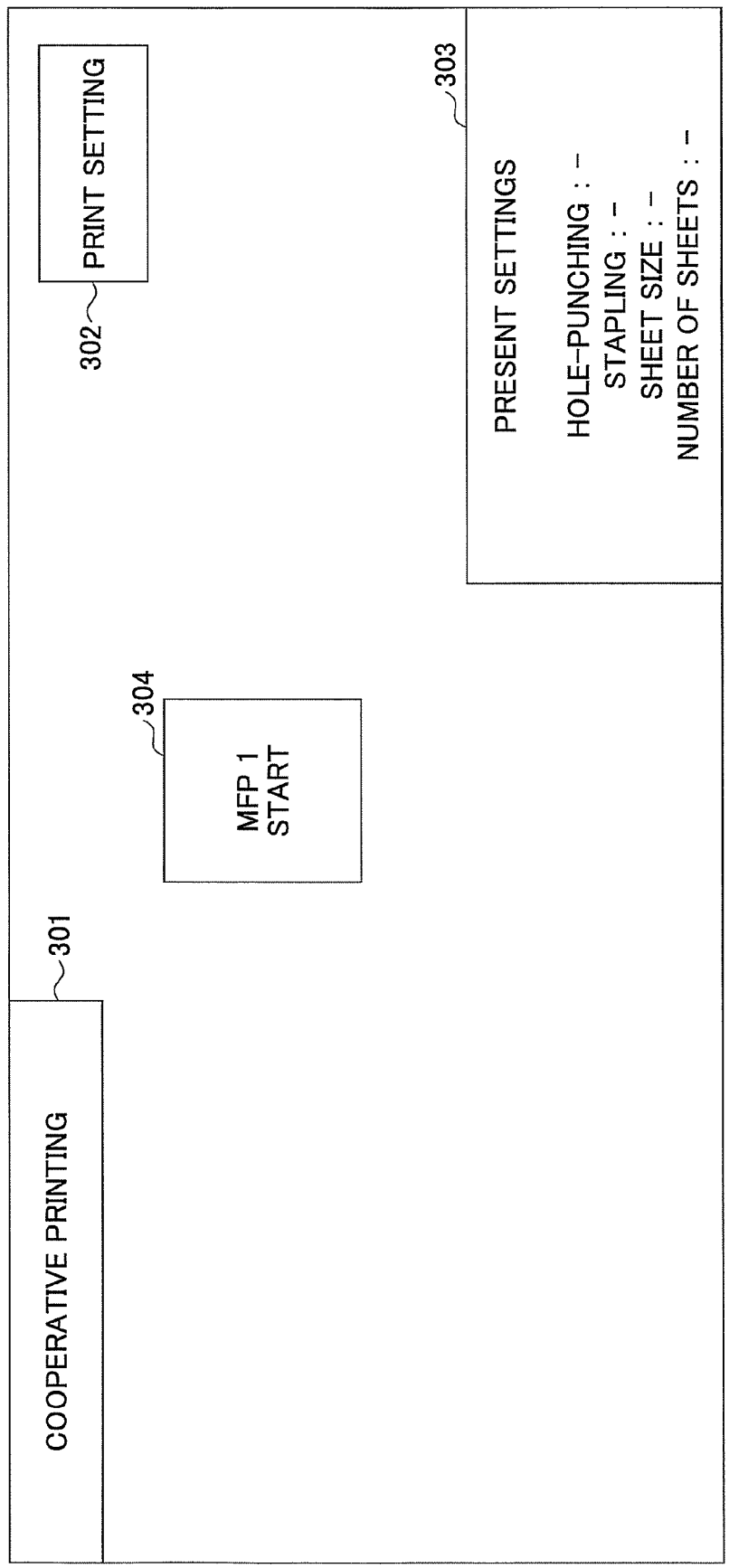
FIG. 4 illustrates an operation screen image (part 1)

FIG. 4 illustrates an operation screen image (part 1). First, the user operates the operation panel 11 of the MFP 1, and presses "print setting" 302. This is for setting print conditions.

FIG. 5 illustrates an operation screen image (part 2). The user sets desired print conditions in the print setting screen image. In this example, print condition parameters are set so that hole-punching is performed, stapling is performed, the sheet size is A4, the overall number of sheets is specified, and the overall number of sheets is 20 sheets. After setting the parameters, the user presses "OK" 401.

Figure 6:
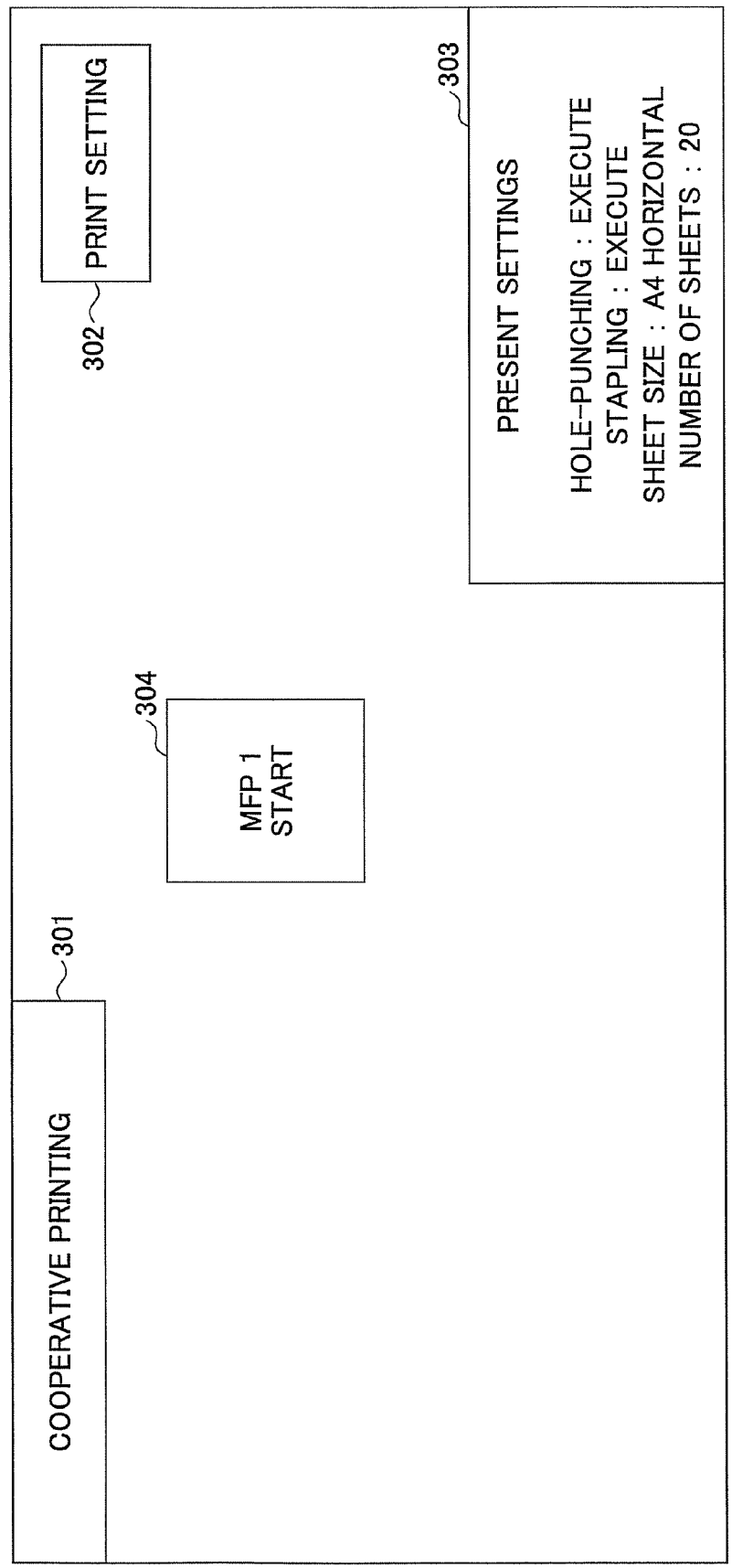
FIG. 6 illustrates an operation screen image (part 3)

FIG. 6 illustrates an operation screen image (part 3). As shown in FIG. 6, the print settings are reflected in "present settings" 303. Next, in order to print plural sheets by device cooperation, the user presses "cooperative printing" 301 in the operation panel 11 of the MFP 1. When device cooperation is not to be performed, and only the MFP 1 is to perform the print operation alone, the user presses "MFP 1 start" 304.

Figure 7:
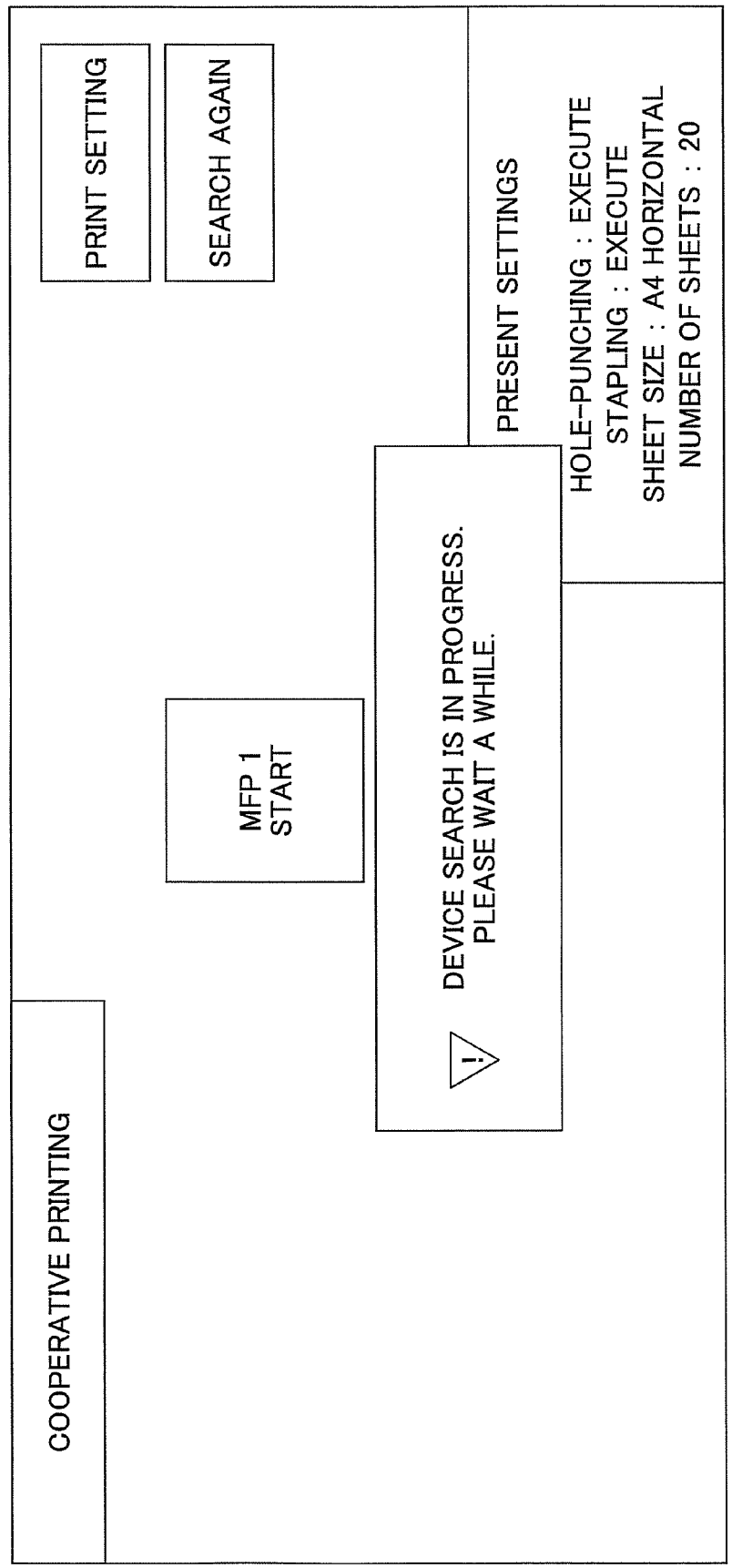
FIG. 7 illustrates an operation screen image (part 4)

FIG. 7 illustrates an operation screen image (part 4). When "cooperative printing" 301 is pressed, devices (MFPs) that can perform device cooperation are searched in the network. For example, a message saying "Device search is in progress. Please wait a while." is displayed. The devices that can execute the print conditions are searched, and the devices that can execute the print conditions are displayed as search results.

Figure 8:
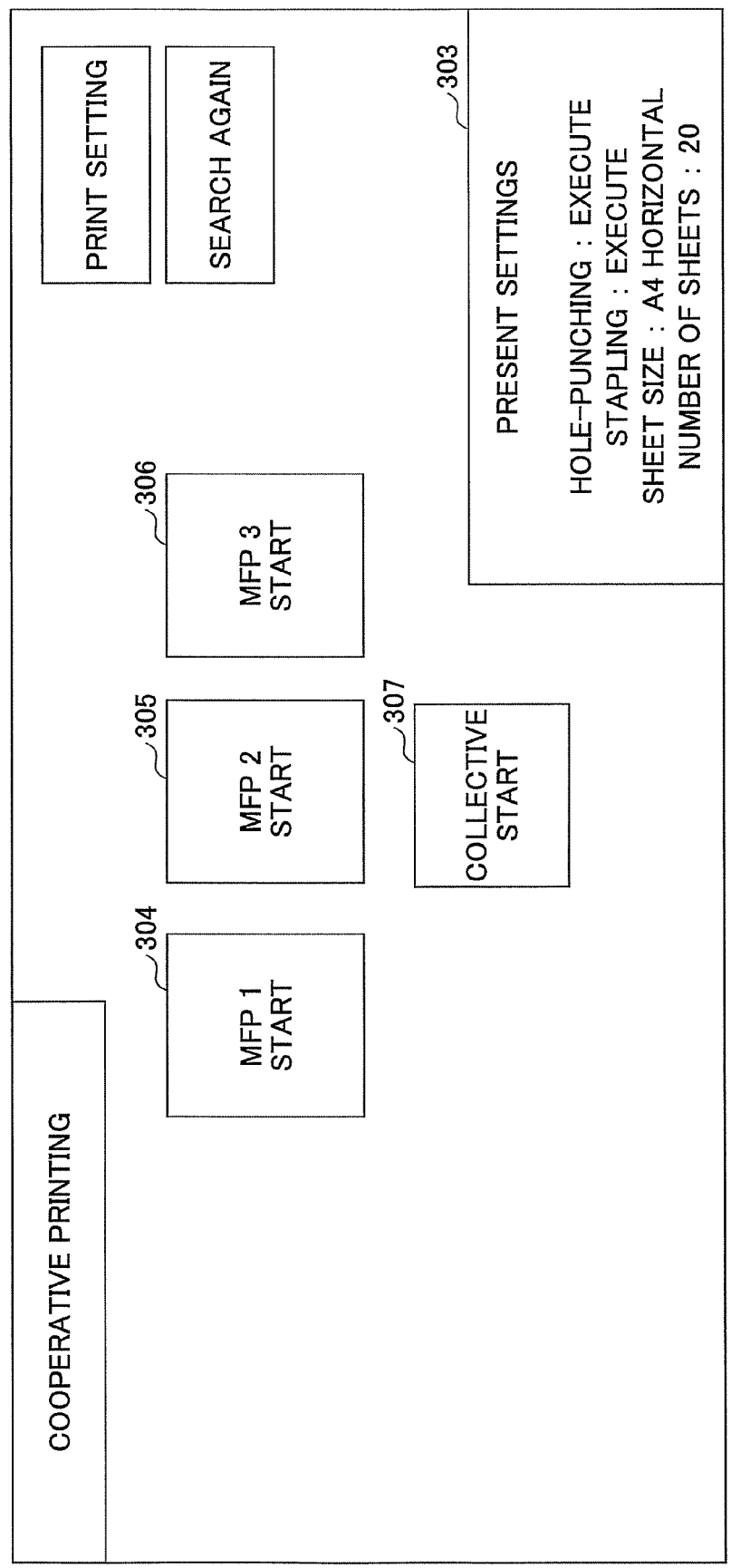
FIG. 8 illustrates an operation screen image (part 5)

FIG. 8 illustrates an operation screen image (part 5). As shown in FIG. 8, MFPs that can perform device cooperation are found in the network, and the search results are displayed. Specifically, MFP 2 and MFP 3 are found as devices that can execute the print conditions. MFP 5 and MFP 6 are not displayed in the search results because they do not satisfy the specified print conditions in some respect, such as not having a stapling function or being out of paper.

In response to the search results, icons of "MFP 2 start" 305 and "MFP 3 start" 306 are added to the operation panel 11. Furthermore, a "collective start" 307 icon is also added. At this stage, if "MFP 1 start" 304 is pressed, the MFP 1 starts printing alone, in accordance with the print conditions of "present settings" 303. If "MFP 2 start" 305 is pressed, the MFP 2 starts printing alone, in accordance with the print conditions of "present settings" 303. The same applies to "MFP 3 start" 306. Meanwhile, if "collective start" 307 is pressed, all of the MFPs, i.e., MFP 1, MFP 2, and MFP 3 start cooperative printing in accordance with the print conditions of "present settings" 303. For example, the 20 print sheets are divided evenly among the MFPs to perform the print operation.

It is assumed that the user first presses "MFP 2 start" 305, and the MFP 2 starts printing alone in accordance with the print conditions of "present settings" 303. At this time, the MFP 1 sends a print job (20 sheets) to the MFP 2.

Figure 9:
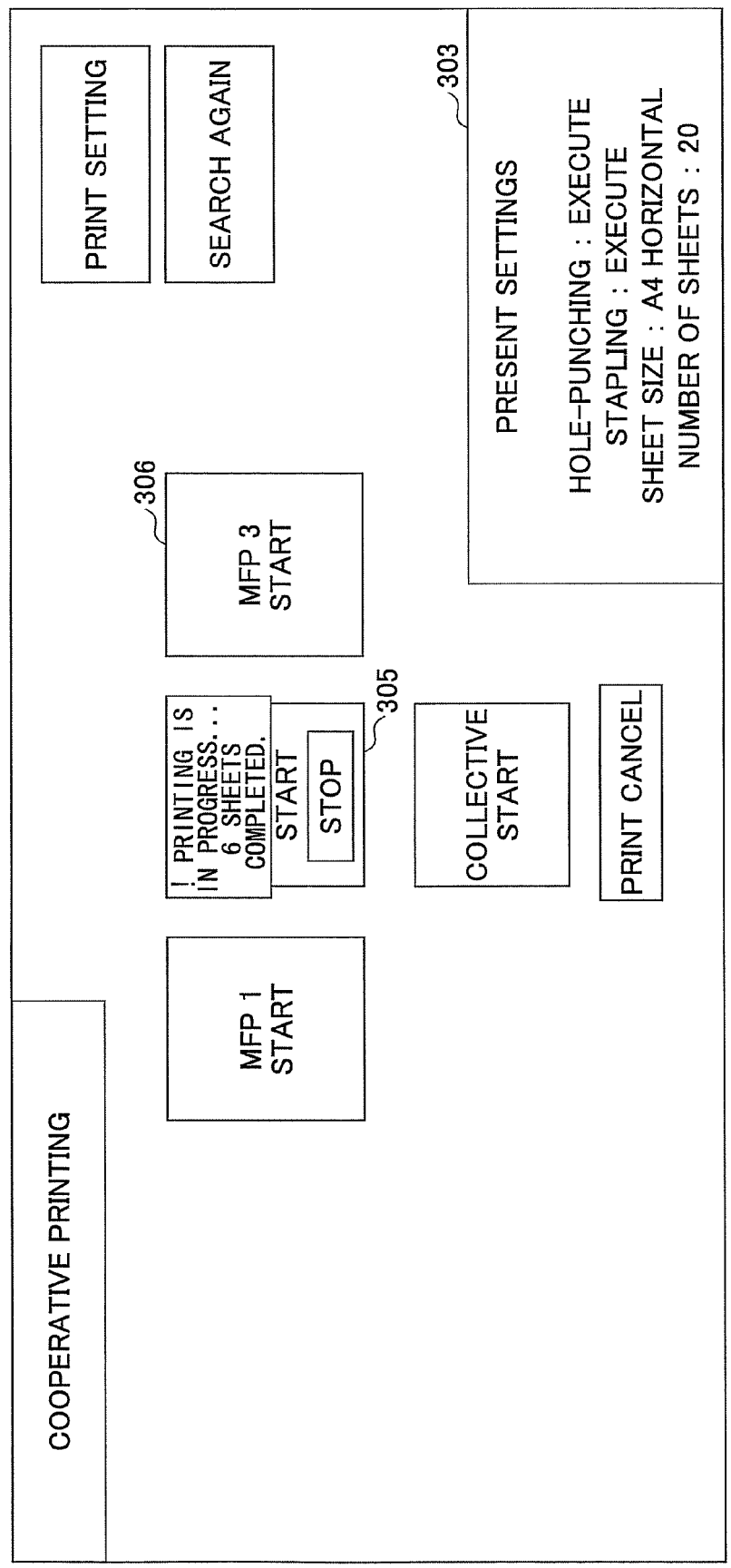
FIG. 9 illustrates an operation screen image (part 6)

FIG. 9 illustrates an operation screen image (part 6). "MFP 2 start" 305 has been pressed, and the MFP 2 has started printing alone in accordance with the print conditions of "present settings" 303. In FIG. 9, a message saying "Printing is in progress. 6 sheets completed." is superposed on the icon of "MFP 2 start" 305, and at this time point, six sheets have been completed among the 20 sheets specified in the print conditions. When the "stop" sign displayed on the icon is pressed, the MFP 2 temporarily stops printing. When "print cancel" is pressed, the print job is cancelled.

Next, the user presses "MFP 3 start" 306, and cooperative printing including MFP 3 is started in accordance with the print conditions of "present settings" 303.

Figure 10:
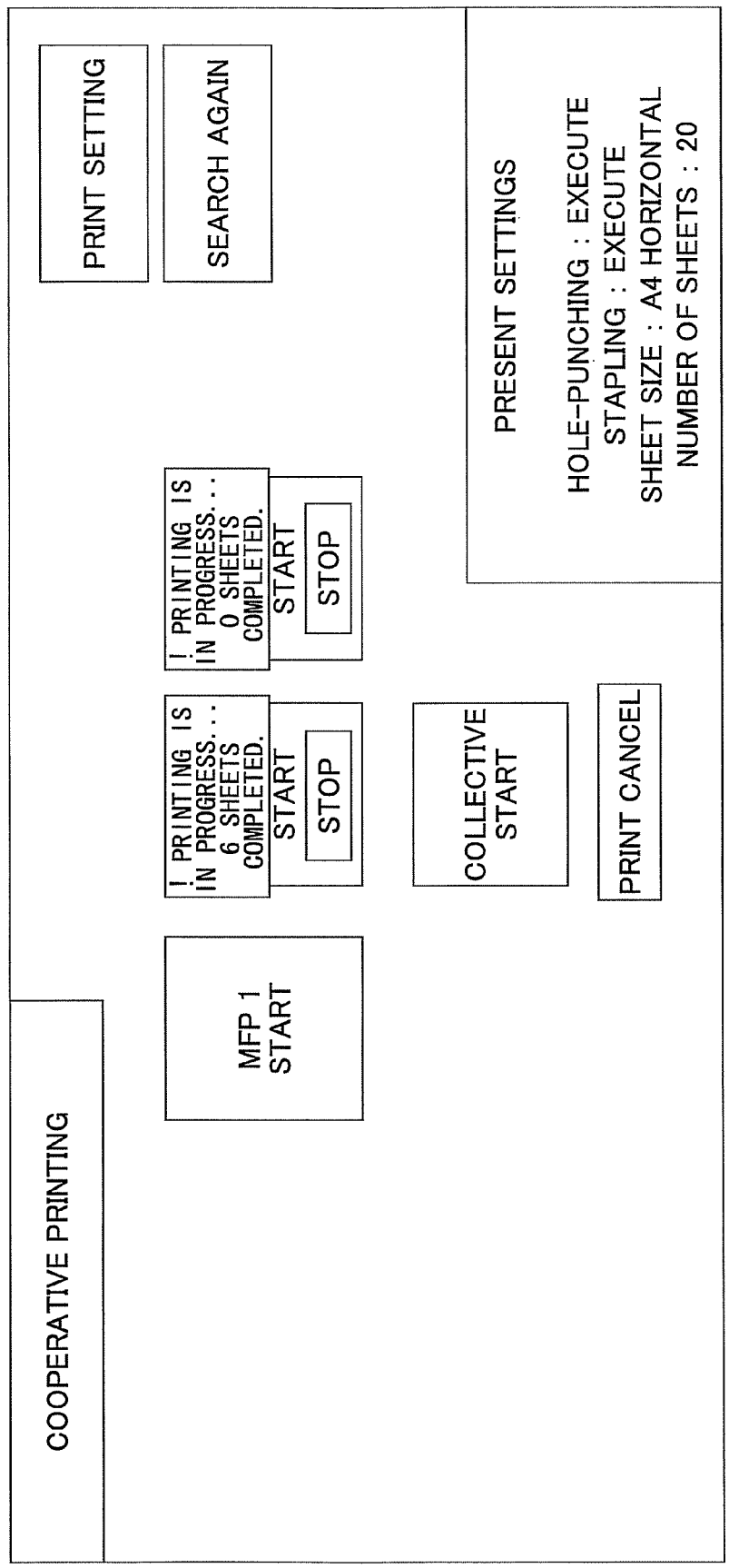
FIG. 10 illustrates an operation screen image (part 7)

FIG. 10 illustrates an operation screen image (part 7). FIG. 10 indicates a screen image example immediately after the user presses "MFP 3 start" 306 and the MFP 3 starts printing. A message saying "Printing is in progress. 0 sheets completed." is superposed on the icon of "MFP 3 start" 306. Thereafter, the print job of 20 sheets is executed by the MFP 2 and the MFP 3.

Figure 11:
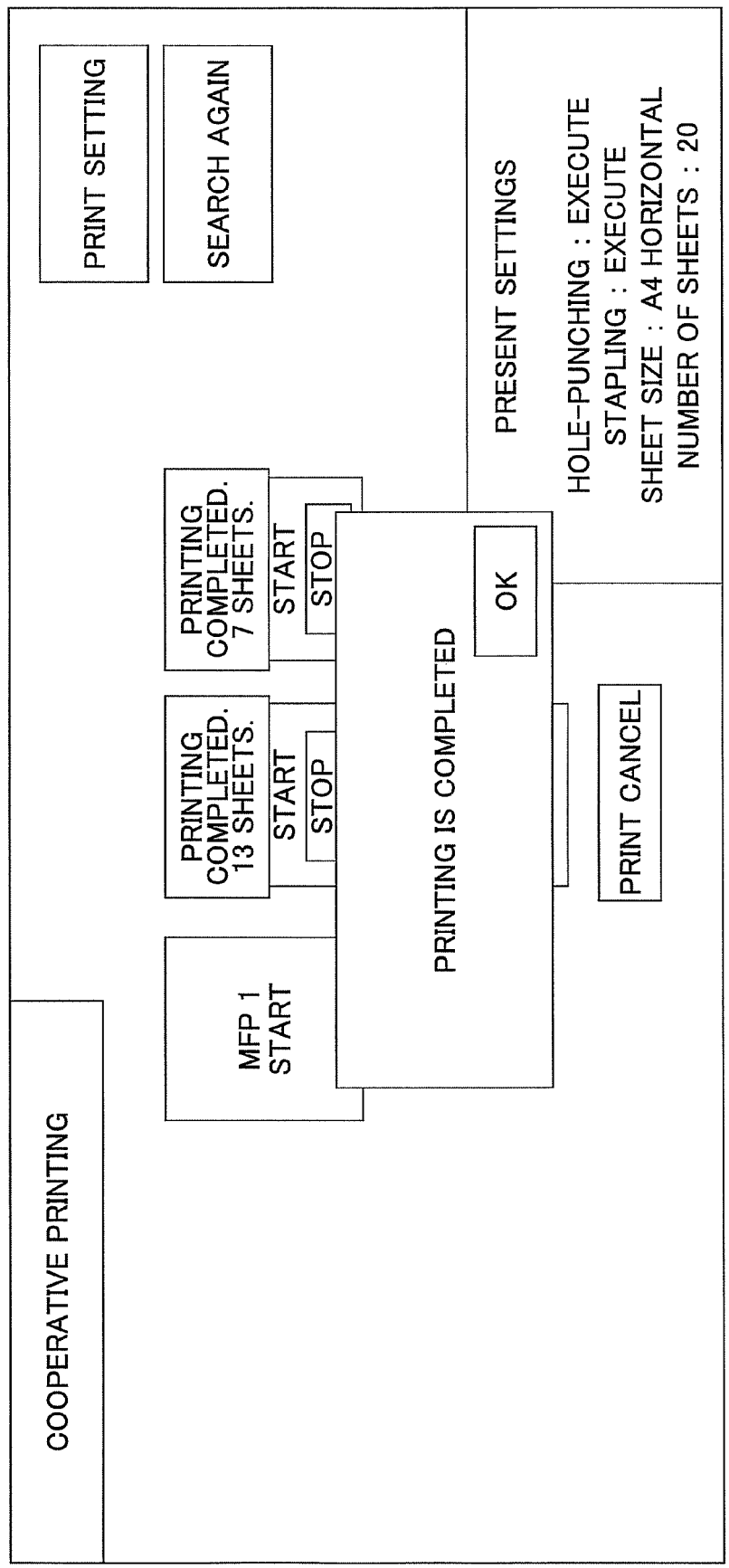
FIG. 11 illustrates an operation screen image (part 8)

FIG. 11 illustrates an operation screen image (part 8). As shown in FIG. 11, a print job of 20 sheets has been completed by the MFP 2 and the MFP 3. As to the breakdown, the MFP 2 printed 13 sheets and the MFP 3 printed seven sheets. At the time point when the MFP 3 starts printing, the MFP 2 has already printed six sheets, and therefore the remaining number of sheets is 14 out of the total of 20 sheets specified in the print conditions. The remaining 14 sheets are distributed between the MFP 2 and the MFP 3. Therefore, when the MFP 1 detects that "MFP 3 start" 306 has been pressed in the operation panel 11, the MFP 1 performs a control operation of, for example, dividing the remaining 14 sheets into halves between the MFP 2 and the MFP 3. That is to say, the MFP 1 instructs the MFP 2 to switch from the existing print job (20 sheets) to another print job (13 sheets), and sends a print job (seven sheets) to the MFP 3.

As described above, when the MFP according to the present embodiment finds MFPs in the network that satisfy desired print conditions, icons of the corresponding MFPs are displayed on the operation panel 11 (FIG. 8). As the user presses "collective start" 307, all of the MFPs collectively start printing. Furthermore, as the user presses each individual MFP icon in the operation panel 11, the corresponding MFP can start printing alone. Even if one MFP is in the course of printing, other MFPs can join the print operation (in this case, the number of sheets is redistributed in consideration of the newly joined MFPs).

For example, when a single MFP starts printing, but there is a large number of sheets, the user recognizes that it may take a long time to complete printing only with the use of the current MFP, based on the progress situation information. Accordingly, by adding additional MFPs to the print operation, the time taken to complete printing can be reduced. In this manner, the MFP according to the present embodiment can flexibly control each individual MFP to start printing based on the progress situation of printing.

Supplement

Figure 12:
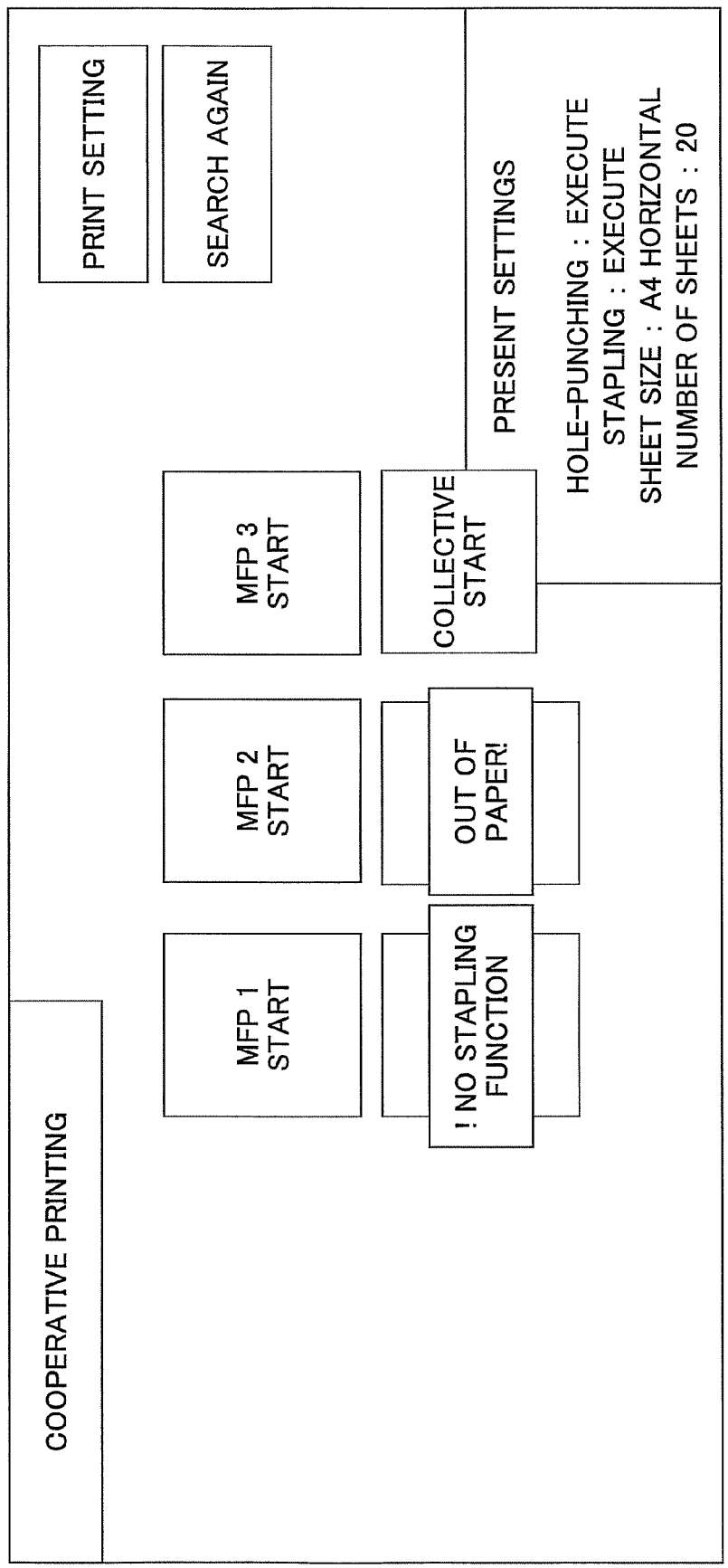
FIG. 12 illustrates an operation screen image (part 9)

FIG. 12 illustrates an operation screen image (part 9). This operation screen image example displays the search results of the devices (MFPs) that can perform device cooperation searched in the network. The MFP 2 and the MFP 3 are found as devices that can execute the print conditions. Furthermore, icons of the MFP 5 and the MFP 6 are also displayed on the operation panel 11, with indications that the MFP 5 does not have a stapling function and the MFP 6 is out of paper (modification of FIG. 8). In this modification, the user can recognize all of the MFPs in the network, and can also recognize the reason why each MFP cannot perform cooperative printing. For example, the user can supply sheets in the MFP 6 so that the MFP 6 becomes capable of performing cooperative printing.

Information Processing 1

Device Searching Process

Figure 13:
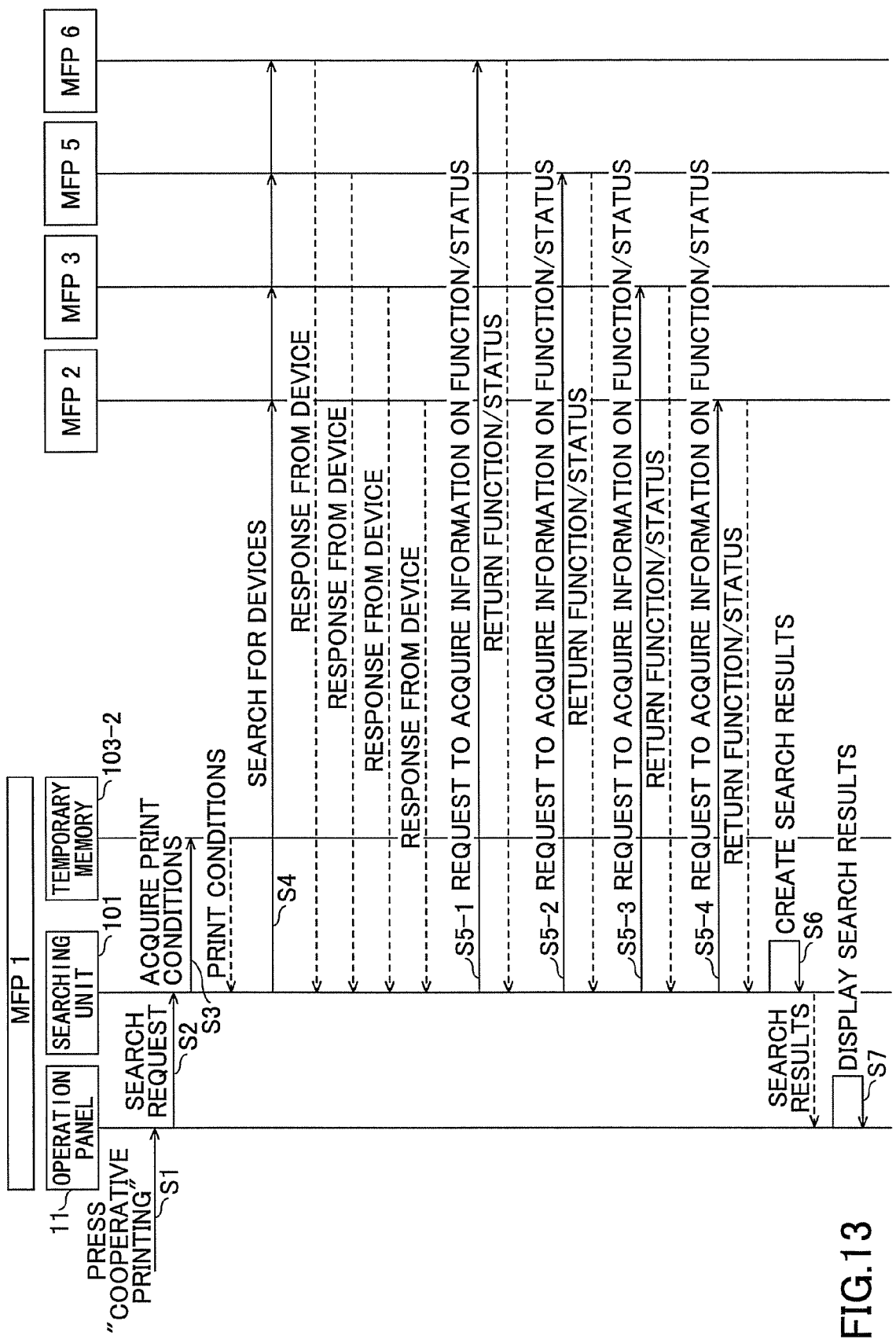
FIG. 13 is a sequence diagram (part 1) for describing a process of the MFP according to an embodiment of the present invention.

FIG. 13 is a sequence diagram (part 1) for describing a process of the MFP according to the present embodiment. This sequence diagram is for describing the device searching process relevant to FIGS. 7 and 8 described above. Specifically, when the user presses "cooperative printing" 301 on the operation panel 11 of the MFP 1, the devices that can perform device cooperation (MFP 2, MFP 3, etc.) are found in the network.

Step S1: The user presses "cooperative printing" 301 in the operation panel 11 (display unit 102) of the MFP 1. This is to search for plural MFPs, and to have the plural MFPs perform cooperative printing.

Step S2: The operation panel 11 sends a search request to the searching unit 101. The search request may include a search condition to search only for devices that satisfy the print conditions and that can be used for cooperative printing, or a search condition to search for all devices that can/cannot be used for cooperative printing. In this example, the search request includes the former search condition, i.e., to search only for devices that satisfy the print conditions and that can be used for cooperative printing.

Step S3: The searching unit 101 acquires print conditions saved in the temporary memory 103-2. This is done for the purpose of applying the print conditions to the search operation to search only for the devices that can be used based on the print conditions. In this example, the print conditions specify 20 sheets, a sheet size of A4 horizontal, stapling, and hole-punching (FIG. 5).

Step S4: The searching unit 101 sends search packets to the network. A known technology may be applied as the search method. For example, search packets are sent by using broadcast packets or multicast packets, and devices can be detected (found) based on whether there are responses. In this example, the MFP 2, the MFP 3, the MFP 5, and the MFP 6 are connected to the network, and therefore response packets are received from these respective MFPs.

Step S5: The searching unit 101 sends function/status detection packets to the MFPs from which responses have been received. For example, SNMP and Web services are used to inquire the respective MFPs about their functions (printing function, stapling/hole-punching functions, etc.) and their statuses (whether there are remaining sheets, etc.). In this example, it is assumed that at least the following information items have been returned with response packets.

MFP 2: printing OK, stapling OK, hole-punching OK, sheets OK

MFP 3: printing OK, stapling OK, hole-punching OK, sheets OK

MFP 5: printing OK, stapling NG, hole-punching OK, sheets OK

MFP 6: printing OK, stapling OK, hole-punching OK, sheets NG

Step S6: The searching unit 101 analyzes the response packets form the MFPs, and determines whether the MFPs are devices satisfying the print conditions to obtain the search results. The search results are sent to the operation panel 11. In this example, the devices satisfying the print conditions are the MFP 2 and the MFP 3.

Step S7: The operation panel 11 displays the search results. The devices satisfying the print conditions are the MFP 2 and the MFP 3, and therefore icons of the MFP 2 and the MFP 3 are additionally displayed on the operation panel 11. Referring back to FIG. 8, icons of the MFP 2 and the MFP 3 are additionally displayed as devices that can execute the print conditions. The MFP 5 does not have a stapling function and the MFP 6 is out of paper, and therefore cannot execute the specified print conditions. Hence, icons of the MFP 5 and the MFP 6 are not displayed. Furthermore, the icon of "collective start" 07 is added.

Furthermore, in step S5, it is possible to embed, in the function/status detection packets, information relevant to the functions and statuses to be inquired (for example, in the case of SNMP, OID is specified). Therefore, it is possible to send function/status detection packets including information relevant to functions and statuses according to the print conditions.

Furthermore, in step S2, when a search request includes a search condition indicating to search for all devices (devices that can/cannot be used), in step S6, the searching unit 101 analyzes the response packets from the MFPs and determines that all devices correspond to the search results. As for the devices that do not satisfy the print conditions, information indication the reason why they do not satisfy the print conditions is also attached. Accordingly, referring back to FIG. 12, on the operation panel 11, there are displayed the icons of the MFP 2 and the MFP 3 that are found as devices that can execute the print conditions, the icon of the MFP 5 with a message indicating that there is no stapling function, and the icon of the MFP 6 with a message indicating that there is no paper.

Printing Process

Figure 14:
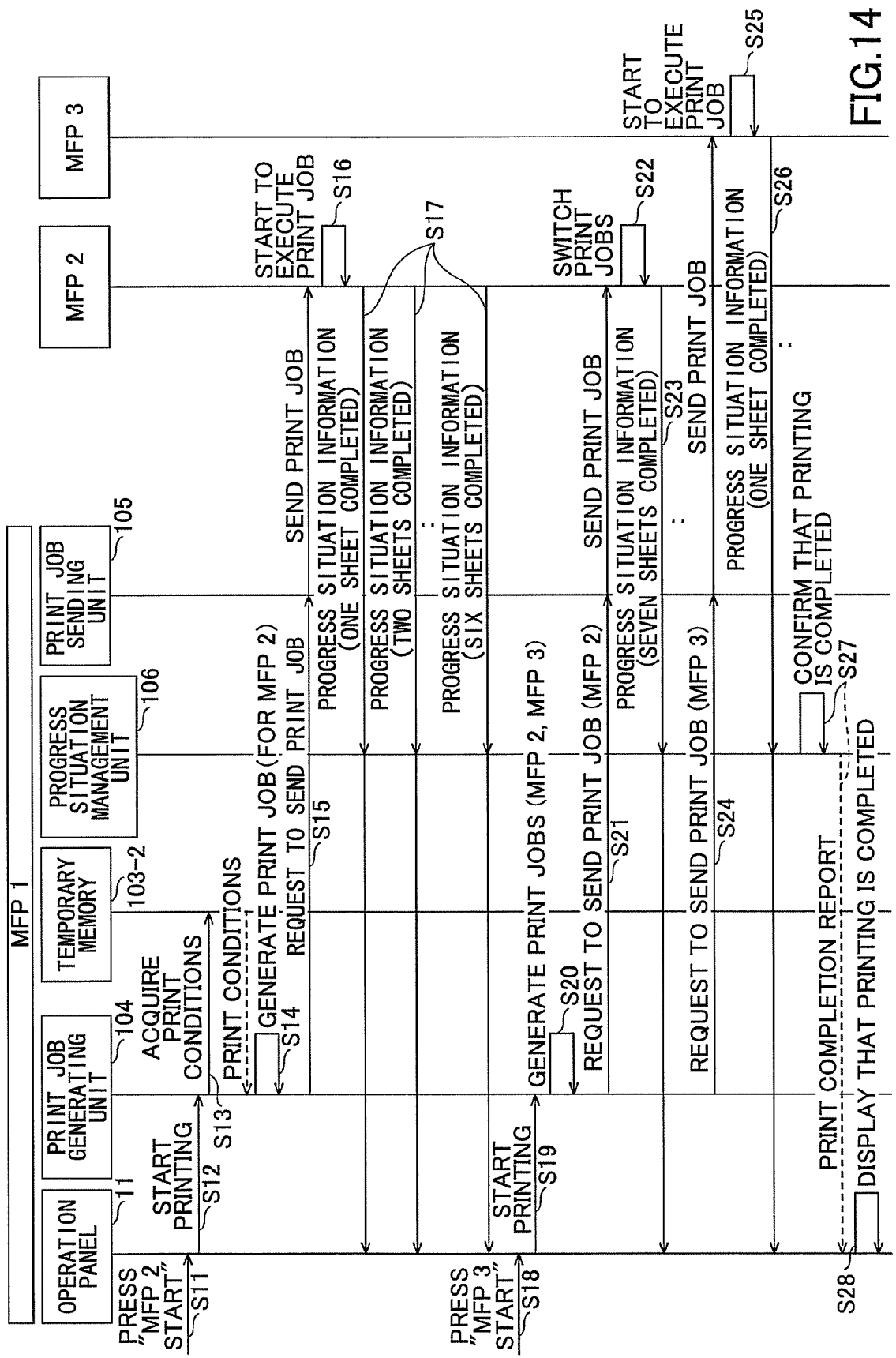
FIG. 14 is a sequence diagram (part 2) for describing a process of the MFP according to an embodiment of the present invention.

FIG. 14 is a sequence diagram (part 2) for describing a process of the MFP according to the present embodiment. This sequence diagram is for describing the printing process relevant to FIGS. 8 through 11 described above. Specifically, when the user presses "MFP 2 start" 305 on the operation panel 11 of the MFP 1, the MFP 2 starts printing alone in accordance with the print conditions of "present settings" 303. Subsequently, the user presses "MFP 3 start" 306 to add the MFP 3 to the printing operation.

Step S11: The user presses "MFP 2 start" 305 in the operation panel 11 of the MFP 1 (see FIG. 8). This is to cause the MFP 2 to start printing.

Step S12: The operation panel 11 requests the print job generating unit 104 to cause the MFP 2, which has been pressed by the user, to start printing.

Step S13: The print job generating unit 104 acquires print conditions from the temporary memory 103-2.

Step S14: The print job generating unit 104 generates a print job (for MFP 2) based on the acquired print conditions. The MFP 2 is the only MFP that is instructed to start printing, and therefore this print job includes contents to be executed by the MFP 2 alone, i.e., 20 sheets, a sheet size of A4 horizontal, stapling, and hole-punching.

Step S15: The print job generating unit 104 sends the print job to the MFP 2 via the print job sending unit 105.

Step S16: When the print job is received, the MFP 2 analyzes the print job, and starts executing the print job.

Step S17: As the print job is being executed, the MFP 2 sends progress situation information to the progress situation management unit 106 of the MFP 1. The progress situation information is reported every time a unit is completed in the print job, i.e., every time one sheet is printed. According to this progress situation information, the progress situation management unit 106 of the MFP 1 can recognize the progress situation of the print job process in a point-by-point manner. Furthermore, the progress situation management unit 106 sends progress situation information to the operation panel 11, and therefore the present print progress situation is displayed on the MFP 2 icon (FIG. 9).

Step S18: The user presses "MFP 3 start" 306 on the operation panel 11 of the MFP 1 (FIG. 9). This is to cause the MFP 3 to start printing. That is to say, cooperative printing by the MFP 2 and the MFP 3 is started.

Step S19: The operation panel 11 requests the print job generating unit 104 to cause the MFP 2, which has been pressed by the user, to start printing.

Step S20: The print job generating unit 104 generates a print job for the MFP 2 and a print job for the MFP 3. At this time point, the MFP 2 has already printed six sheets, and therefore the remaining number of sheets is 14 out of the total of 20 sheets. To print the remaining 14 sheets by cooperative printing by the MFP 2 and the MFP 3, the remaining 14 sheets are evenly divided between the MFP 2 and the MFP 3 (i.e., seven sheets each).

For the MFP 3, a print job specifying seven sheets, a sheet size of A4 horizontal, stapling, and hole-punching is generated.

For the MFP 2, a print job for changing the previous print job (20 sheets) is generated. Specifically, a print job specifying to change the number of sheets to 13 is generated. Alternatively, the previous print job (total of 20 sheets) may be canceled, and a new print job may be generated. In this case, a print job specifying 13 sheets, a sheet size of A4 horizontal, stapling, and hole-punching is generated. The 13 sheets include the six sheets that have already been printed plus the seven sheets that are newly assigned.

Step S21: The print job generating unit 104 sends the print job (as described above) to the MFP 2 via the print job sending unit 105.

Step S22: When the print job is received, the MFP 2 interprets the print job, switches from the previous print job (20 sheets) to the new print job (13 sheets), and executes the new print job. At this time point, the MFP 2 has already completed printing six sheets, and the MFP 2 continues printing until 13 sheets are printed.

Step S23: The MFP 2 sends a message that the print job is being executed to the progress situation management unit 106 of the MFP 1. The progress situation information is reported every time a unit is completed in the print job, i.e., every time one sheet is printed. The progress situation management unit 106 sends the progress situation information to the operation panel 11, so that the current print progress situation status is displayed on the icon of the MFP 2 (FIG. 10).

Step S24: The print job generating unit 104 sends the print job (as described above) to the MFP 3 via the print job sending unit 105.

Step S25: When the print job is received, the print job receiving unit 107 of the MFP 3 interprets the print job, and the print job executing unit 108 starts executing the print job.

Step S26: The MFP 3 sends a message that the print job is being executed to the progress situation management unit 106 of the MFP 1. The progress situation management unit 106 sends the progress situation information to the operation panel 11, so that the current print progress situation status is displayed on the icon of the MFP 3 (FIG. 10).

Step S27: The progress situation management unit 106 recognizes the progress situation information, and when the progress situation management unit 106 confirms that printing is completed for the total of 20 sheets, the progress situation management unit 106 sends a print completion report to the operation panel 11.

Step S28: The operation panel 11 displays a message saying that printing is completed (FIG. 11). Consequently, in the present embodiment, the MFP 2 has printed 13 sheets, and the MFP 3, which joined in the middle of the print operation, has printed seven sheets.

In step S20, when the print job generating unit 104 generates a print job for the MFP 2 and a print job for the MFP 3, the remaining 14 sheets are evenly divided between the MFP 2 and the MFP 3 (i.e., seven sheets each). However, the remaining sheets do not necessarily need to be divided evenly. The specific number of sheets to be distributed and the distribution ratio may be arbitrarily changed with the print settings. When the MFPs have different processing capabilities, a large number of sheets may be distributed to an MFP with high processing capability and a small number of sheets may be distributed to an MFP with low processing capability, so that the MFPs performing cooperative printing finish printing at the same time when all of the sheets are printed.

Furthermore, for example, in FIG. 9, a "stop" button is provided on the MFP 2 icon. By pressing this "stop" button, the printing operation can be temporarily stopped. Then, when the "MFP 3 start" 306 is pressed, a print job for the MFP 3 is generated so that the remaining 14 sheets are assigned to the MFP 3.

Figure 15:
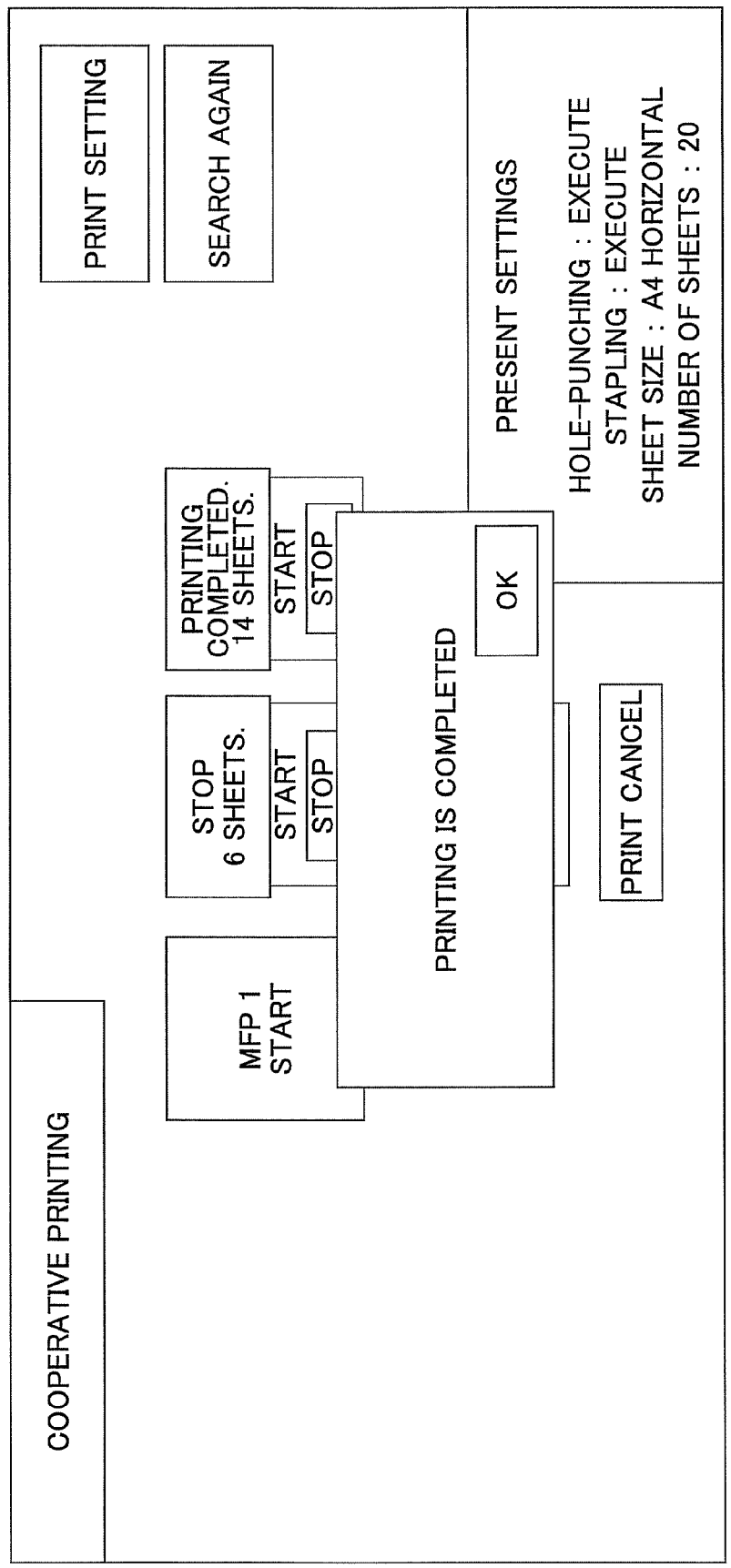
FIG. 15 illustrates an operation screen image (part 10)

FIG. 15 illustrates an operation screen image (part 10). As shown in FIG. 15, a print job of 20 sheets is completed by the MFP 2 and the MFP 3. As to the breakdown, the MFP 2 printed six sheets (because the MFP 2 was temporarily stopped in the middle of the print operation) and the MFP 3 printed 14 sheets.

Information Processing 2

Device Searching Process

Figure 16:
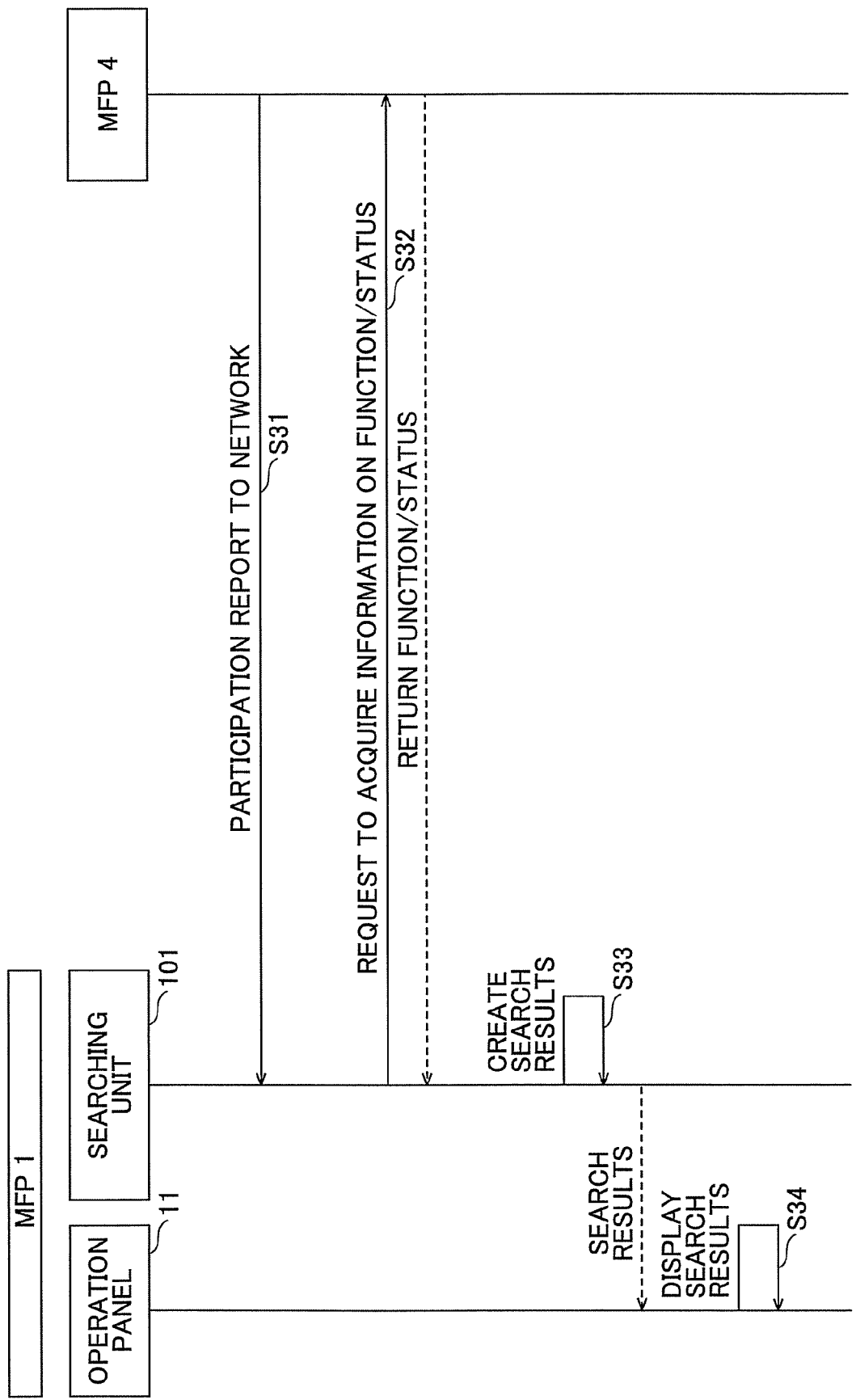
FIG. 16 is a sequence diagram for describing a process when the MFP according to an embodiment of the present invention joins the network.

FIG. 16 is a sequence diagram for describing a process when the MFP according to the present embodiment joins the network. As indicated in the system configuration illustrated in FIG. 1, the MFP 4 is additionally connected to the network afterwards. A description is given of a process performed when the MFP 4 joins the network. Furthermore, it is assumed that the operation panel 11 of the MFP 1 is in a state as shown in FIG. 8 after undergoing the process shown in FIG. 13.

Step S31: First, when the MFP 4 is connected to the network, for example, the MFP 4 sends participation report packets to the network by using broadcast packets or multicast packets, to report that the MFP 4 has been connected to the network.

Step S32: When the participation report is received from the MFP 4, the searching unit 101 of the MFP 1 sends function/status searching packets to the MFP 4. For example, SNMP and Web services are used to inquire the respective MFPs about their functions (printing function, stapling/hole-punching functions, etc.) and their statuses (whether there are remaining sheets, etc.). In this example, it is assumed that at least the following information items have been returned with response packets.

MFP 4: printing OK, stapling OK, hole-punching OK, sheets OK

Step S33: The searching unit 101 analyzes the response packets from the MFP 4, and determines whether the MFP 4 is a device satisfying the print conditions to obtain the search results. The search results are sent to the operation panel 11.

Step S34: The operation panel 11 displays the search results. The devices satisfying the print conditions are the MFP 2, the MFP 3, and also the MFP 4, and therefore icons of the MFP 2, the MFP 3, and the MFP 4 are displayed on the operation panel 11.

Figure 17:
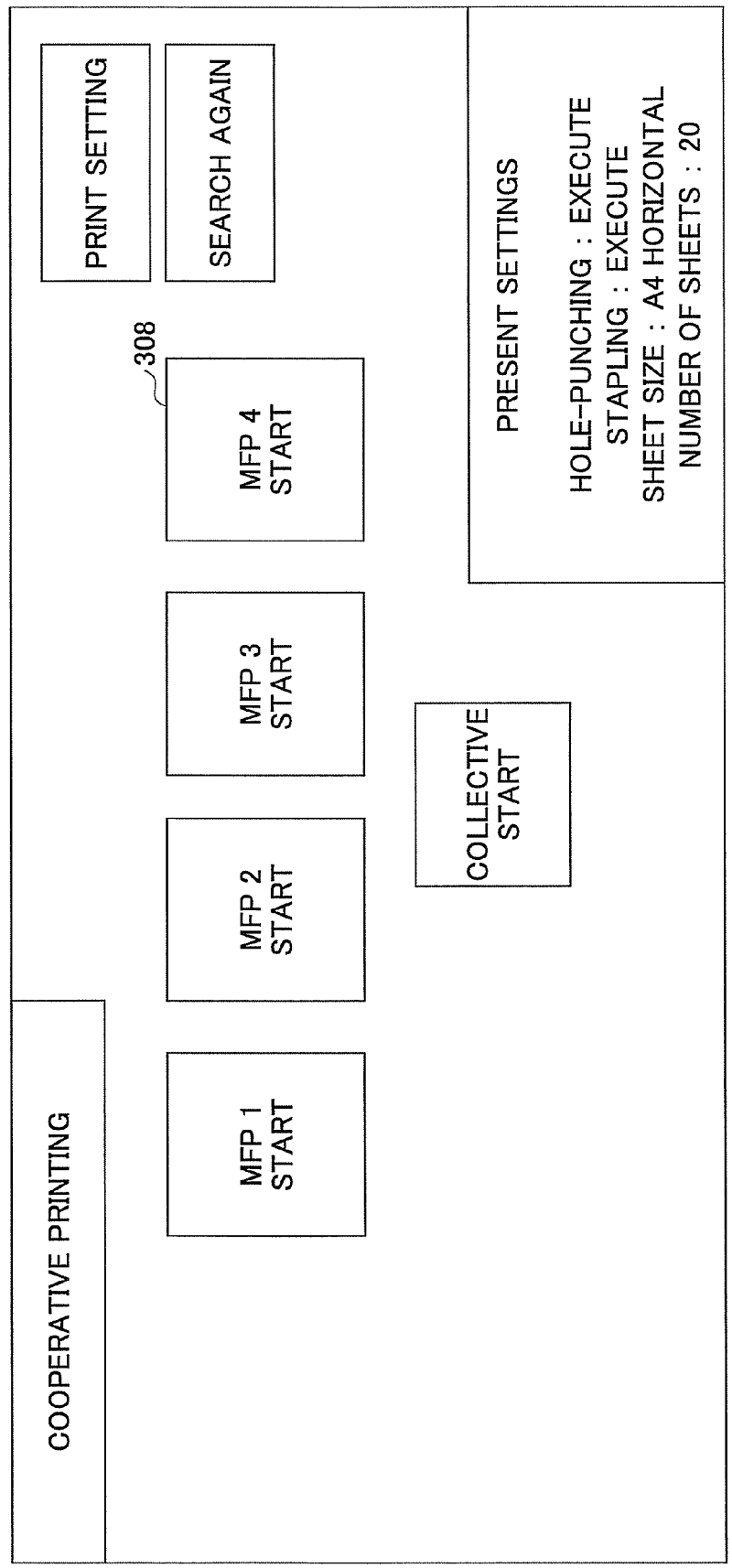
FIG. 17 illustrates an operation screen image (part 11)

FIG. 17 illustrates an operation screen image (part 11). As shown in FIG. 17, in addition to the MFP 1, the MFP 2, and the MFP 3, an icon "MFP 4 start" 308 of the MFP 4 that has newly joined the network is displayed as a device that can execute the print conditions.

The print process beyond this point is the same as that described with reference to FIG. 14. That is to say, when the user presses "MFP 2 start" 305 on the operation panel 11 of the MFP 1, one of the MFPs (for example, the MFP 2) starts printing alone in accordance with the print conditions of "present settings" 303. Subsequently, the MFP 3 and the MFP 4 are added to the print operation. Furthermore, in a case where the MFP 4 is detected during cooperative printing upon performing the process of network participation described with reference to FIG. 16, the user can subsequently add the MFP 4 to the print operation.

Figure 18:
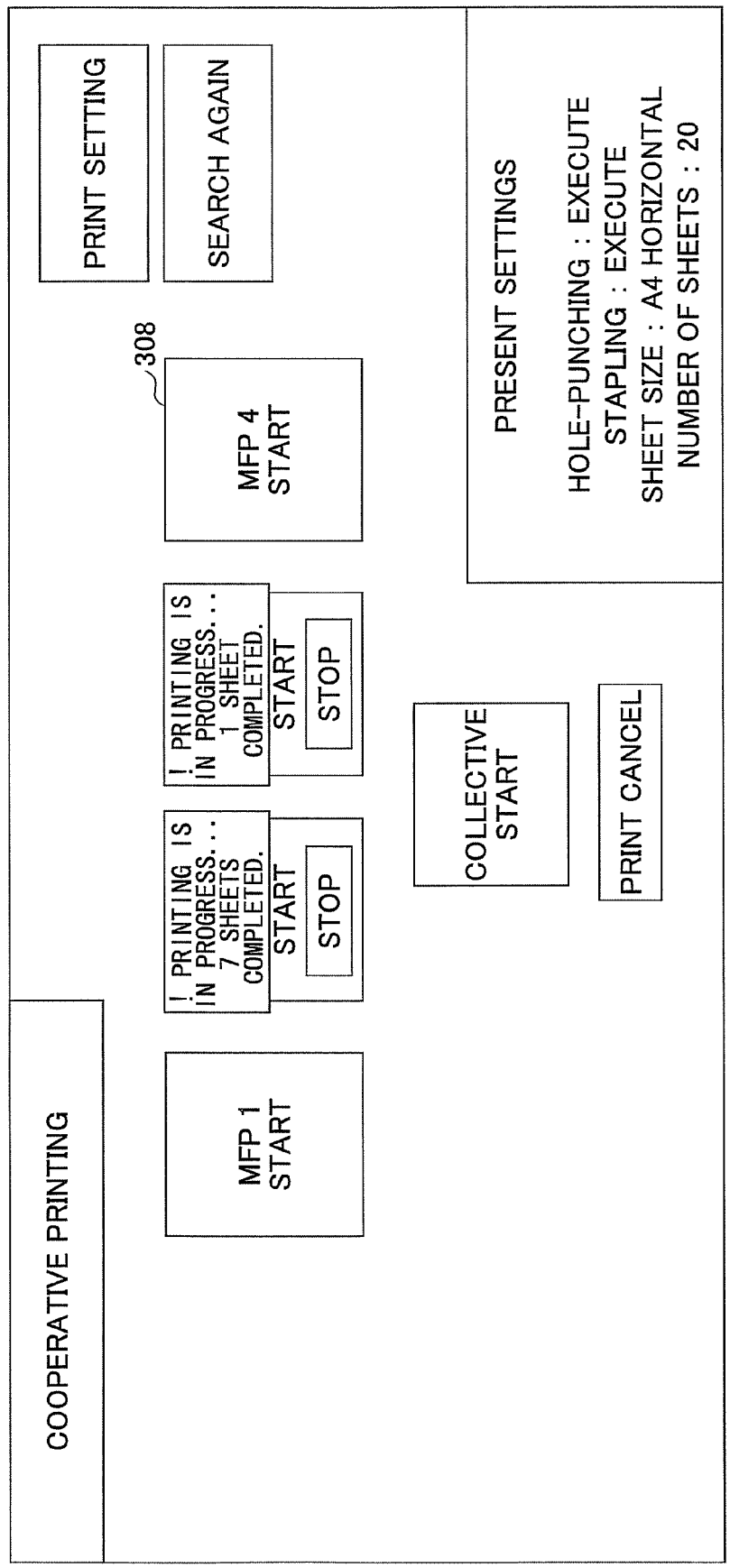
FIG. 18 illustrates an operation screen image (part 12).

FIG. 18 illustrates an operation screen image (part 12). FIG. 18 shows a state of the operation panel 11 where the MFP 4 has been newly found, after the MFP 2 has printed seven sheets and the MFP 3 has printed one sheet upon performing the information processing described with reference to FIG. 14. By pressing "MFP 4 start" 308 at this time, the user can add the MFP 4 to the print operation. At this time point, a total of eight sheets have been printed in the cooperative printing, and the remaining number of sheets is 12. Therefore, print jobs for evenly dividing the 12 sheets among the MFPs (four sheets each) are generated and sent to the respective MFPs. Specifically, the print job generating unit 104 generates a print job of 11 sheets for the MFP 2, a print job of 5 sheets for the MFP 3, and a print job of 4 sheets for the MFP 4, and the print job sending unit 105 sends these jobs to the respective MFPs.

Overview

When the MFP according to the present embodiment finds another MFP that satisfies the desired print conditions in the network, an icon of the found MFP is displayed on the operation panel 11. Furthermore, by pressing the individual icons of the MFPs on the operation panel 11, the user can separately cause each of the MFPs to start printing. Even while one of the MFPs is performing the print operation, another MFP can participate in the middle of the print operation (in this case, the number of sheets is redistributed in consideration of the newly joined MFPs). Accordingly, each individual MFP can be flexibly controlled to start printing.

According to one embodiment of the present invention, an image forming apparatus, a device cooperation system, and a device cooperation method are provided, which are capable of flexibly controlling instructions given to each of the cooperative devices for executing jobs, in a device cooperation system including plural devices that execute jobs in cooperation with each other.

The present invention is not limited to the specific embodiments described herein, and variations and modifications may be made without departing from the scope of the present invention.

The present application is based on Japanese Priority Patent Application No. 2010-249483, filed on Nov. 8, 2010, the entire contents of which are hereby incorporated herein by reference.

What is claimed is:

1. An image forming apparatus, comprising:
a print condition input unit configured to input print setting conditions;
a search unit configured to search for image forming apparatuses that are capable of executing the print setting conditions, in a network having a plurality of image forming apparatuses connected thereto executing print jobs in a cooperative manner;
a display unit configured to display, on a display device, icons of the image forming apparatuses found by the search unit;
a print job generating unit configured to generate a first print job to be executed by each image forming apparatus found by the search unit in accordance with the print setting conditions, when an icon of a first image forming apparatus displayed by the display unit is operated;
a print job sending unit configured to send the first print job generated by the print job generating unit to the first image forming apparatus whose icon has been operated; and
a progress situation management unit configured to manage progress situation information of a number of sheets printed in print jobs displayed on the display unit, wherein
when an icon of a second image forming apparatus displayed by the display unit is operated causing activation of the second image forming apparatus to start printing with the first image forming apparatus in the cooperative manner, while the first image forming apparatus has started printing the first print job and has started sending the progress situation information of the number of sheets already printed to the progress situation management unit but before the first image forming apparatus completes printing the first print job, the print job generating unit causes the first print job to be interrupted, cancels the first print job and generates new print jobs for each of the first and second image forming apparatuses according to the progress situation information of the number of sheets already printed in the first print job, and
the print job sending unit sends the new print jobs to the first image forming apparatus and the second image forming apparatus.

2. The image forming apparatus according to claim 1, wherein
the search unit searches, in the network, for image forming apparatuses that are not capable of executing the print setting conditions in addition to the image forming apparatuses that are capable of executing the print setting conditions, and
the display unit displays icons of the image forming apparatuses that are not capable of executing the print setting conditions found by the search unit, together with information indicating specific print setting conditions that cannot be executed by the image forming apparatuses that are not capable of executing the print setting conditions.

3. The image forming apparatus according to claim 1, wherein
when a participation report is received from an image forming apparatus that is newly connected to the network, the search unit determines whether the image forming apparatus that is newly connected can execute the print setting conditions.

4. The image forming apparatus according to claim 1, wherein
when the print job generating unit generates the new print jobs for the first and second image foaming apparatuses based on a remaining number of sheets to be printed, evenly divided between the first image forming apparatus and the second image forming apparatus.

5. The image forming apparatus according to claim 1, wherein
when the print job generating unit generates the new print jobs for the first and second image forming apparatuses based on a remaining number of sheets to be printed, so that the remaining number of sheets is divided between the first image forming apparatus and the second image forming apparatus based on sheet assignment numbers set in advance and or based on a sheet assignment ratio set in advance.

6. A device cooperation system, comprising:
a network; and
a plurality of image forming apparatuses executing print jobs in a cooperative manner, connected to each other via the network,
wherein each of the plural image forming apparatuses comprises:
a print condition input unit configured to input print setting conditions;
a search unit configured to search, in the network, for image forming apparatuses that are capable of executing the print setting conditions;
a display unit configured to display, on a display device, icons of the image forming apparatuses found by the search unit;
a print job generating unit configured to generate a first print job to be executed by each image forming apparatus found by the search unit in accordance with the print setting conditions, when a first icon of an image forming apparatus displayed by the display unit is operated;
a print job sending unit configured to send the first print job generated by the print job generating unit to the first image forming apparatus whose icon has been operated; and
a progress situation management unit configured to manage progress situation information of a number of sheets printed in print jobs displayed on the display unit, wherein
when an icon of a second image forming apparatus displayed by the display unit is operated causing activation of the second image forming apparatus to start printing with the first image forming apparatus in the cooperative manner, while the first image forming apparatus has started printing the first print job and has started sending the progress situation information of the number of sheets already printed to the progress situation management unit but before the first image forming apparatus completes printing the first print job, the print job generating unit causes the first print job to be interrupted, cancels the first print job and generates new print jobs for each of the first and second image forming apparatuses according to the progress situation information of the number of sheets already printed in the first print job, and the print job sending unit sends the new print jobs to the first image forming apparatus and the second image forming apparatus.

7. A device cooperation method comprising:

inputting print setting conditions;

searching, for image forming apparatuses that are capable of executing the print setting conditions in a network having a plurality of image forming apparatus connected thereto executing print jobs in a cooperative manner;

displaying, on a display device, icons of the image forming apparatuses found during searching;

generating a first print job to be executed by each image forming apparatus found during the searching in accordance with the print setting conditions, when an icon of a first image forming apparatuses displayed on the display device is operated;

sending the first print job generated to the first image forming apparatus whose icon has been operated;

managing progress situation information of a number of sheets printed in print jobs displayed on the display device;

causing the first print job to be interrupted;

canceling the first print job;

when an icon of a second image forming apparatus displayed on the display device is operated causing activation of the second image forming apparatus to start printing with the first image forming apparatus in the cooperative manner, generating new print jobs for each of the first and second image forming apparatuses according to the progress situation information of the number of sheets already printed in the first print job, while the first image forming apparatus has started printing the first print job and has started sending the progress situation information of the number of sheets already printed but before the first image forming apparatus completes printing the first print job; and sending the new print jobs to the first image forming apparatus and the second image forming apparatus.

* * * * *